(12) United States Patent
Harris et al.

(10) Patent No.: US 10,559,054 B2
(45) Date of Patent: Feb. 11, 2020

(54) GRAPHICS PROCESSING SYSTEMS

(71) Applicant: ARM Limited, Cambridge (GB)

(72) Inventors: Peter Harris, Cambridge (GB); Michel Iwaniec, Cambridge (GB); Edvard Fielding, Trondheim (NO)

(73) Assignee: Arm Limited, Cambridge (GB)

(*) Notice: Subject to any disclaimer, the term of this patent is extended or adjusted under 35 U.S.C. 154(b) by 0 days.

(21) Appl. No.: 14/681,479

(22) Filed: Apr. 8, 2015

(65) Prior Publication Data
US 2015/0302545 A1    Oct. 22, 2015

(30) Foreign Application Priority Data

Apr. 16, 2014    (GB) .................................. 1406872.0

(51) Int. Cl.
*G06T 1/20*    (2006.01)

(52) U.S. Cl.
CPC ..................................... *G06T 1/20* (2013.01)

(58) Field of Classification Search
CPC .. G06T 1/20; G06T 1/60; G06T 15/50; G06T 15/60; G06T 15/80; G06T 2210/12; G06T 2215/12
See application file for complete search history.

(56) References Cited

U.S. PATENT DOCUMENTS

| | | | |
|---|---|---|---|
| 5,345,541 A | 9/1994 | Kelley et al. | |
| 5,870,097 A | 2/1999 | Snyder et al. | |
| 5,977,977 A | 11/1999 | Kajiya et al. | |
| 6,259,461 B1 | 7/2001 | Brown | |
| 6,484,186 B1* | 11/2002 | Rungta | G06F 11/1466 |
| 6,697,063 B1 | 2/2004 | Zhu | |

(Continued)

FOREIGN PATENT DOCUMENTS

| | | |
|---|---|---|
| CN | 101364310 | 2/2009 |
| CN | 101620724 | 1/2010 |

(Continued)

OTHER PUBLICATIONS

Search Report dated Oct. 14, 2014 in GB Patent Application No. GB1406872.0, 5 pages.

(Continued)

*Primary Examiner* — Phuc N Doan
(74) *Attorney, Agent, or Firm* — Vierra Magen Marcus LLP

(57) ABSTRACT

A graphics processing system includes a graphics processor and a memory for storing data to be used by and generated by the graphics processor. In a first rendering pass, the graphics processor generates an array of graphics data and stores the generated array of graphics data in the memory. The array of graphics data generated in the first rendering pass is used in a subsequent rendering pass. In the first rendering pass, the graphics processor determines one or more regions of the array of graphics data that have a particular characteristic, and generates information indicative of the one or more regions. In the subsequent rendering pass, the graphics processor uses the information indicative of the one or more regions to control the reading of the array of graphics data when it is to be used in the subsequent rendering pass.

14 Claims, 6 Drawing Sheets

(56) References Cited

U.S. PATENT DOCUMENTS

| | | | | |
|---|---|---|---|---|
| 7,023,437 B1* | 4/2006 | Voorhies | ............... | G06T 15/005 345/419 |
| 7,242,408 B1* | 7/2007 | Dunn | ...................... | G06T 15/04 345/426 |
| 7,528,839 B1* | 5/2009 | Cunniff | ..................... | G06T 5/20 345/420 |
| 8,760,460 B1* | 6/2014 | Kilgariff | ................... | G06T 1/60 345/543 |
| 8,970,584 B1* | 3/2015 | Aila | ........................ | G06T 11/40 345/420 |
| 9,317,948 B2* | 4/2016 | Tapply | .................... | G06T 11/40 |
| 2008/0002894 A1 | 1/2008 | Hayon et al. | | |
| 2008/0031402 A1 | 2/2008 | Xue et al. | | |
| 2009/0201306 A1* | 8/2009 | Dyke | .................... | G09G 5/395 345/545 |
| 2010/0177105 A1* | 7/2010 | Nystad | ................... | G06T 11/40 345/522 |
| 2011/0080419 A1* | 4/2011 | Croxford | ............... | G09G 5/393 345/531 |
| 2011/0148892 A1 | 6/2011 | Shreiner et al. | | |
| 2013/0229414 A1 | 9/2013 | Gruber | | |
| 2014/0063034 A1 | 3/2014 | Abarca et al. | | |
| 2014/0354664 A1* | 12/2014 | Brown | ................... | G09G 5/363 345/545 |
| 2014/0375666 A1* | 12/2014 | Akenine-Moller | ....... | G06T 9/00 345/555 |

FOREIGN PATENT DOCUMENTS

| | | |
|---|---|---|
| CN | 102033728 | 4/2011 |
| EP | 1434172 A2 | 6/2004 |
| GB | 2517250 A | 2/2015 |

OTHER PUBLICATIONS

U.S. Appl. No. 13/908,312, filed Jun. 3, 2013.
Chinese Office Action dated Dec. 12, 2018, Chinese Patent Application No. 201510179864.9.
Great Britain Examination Report dated Sep. 30, 2019 in Application No. GB1406872.0 (7 pages).

* cited by examiner

GRAPHICS PROCESSING SYSTEMS

BACKGROUND

The technology described herein relates to the processing of graphics, and in particular to the processing of 3-dimensional (3D) graphics, for, e.g., display on a display screen.

As is known in the art, graphics processing typically involves carrying out a sequence of operations on graphics data to generate the final image that is displayed. These operations are often carried out in a pipelined fashion. For example, two common stages of a graphics processing pipeline are so-called vertex shading operations that are carried out on the vertices of primitives (polygons) representing the image to be displayed, and the subsequent fragment (pixel) shading operations that shade (colour) the individual fragments (pixels) that make up the image to be displayed.

Typically, in these processes, once the input data values for a scene have been vertex "shaded", the primitives representing the scene are then usually rasterised to generate an array of "fragments" to be processed for the scene. (As is known in the art, "fragments" are the discrete graphical entities on which the graphics processing operations (such as rendering) are carried out. Each fragment will correspond to a sampling point or sampling points of the scene and have associated with it the necessary data, such as red, green, blue (RGB) colour values, an alpha (transparency) value, and a depth value, to allow the sample point(s) to be displayed. (Fragments may also be referred to as pixels, although it is not inevitably the case that a given fragment will correspond exactly to a single pixel (pixel element) in the final display, as overdraw, blending, multi-sample anti-aliasing, or post-processing, such as down-scaling, may mean that there is not a one-to-one correspondence between the entities (fragments) that the graphics processing operates on and the display pixels.))

The graphics fragments, once generated, undergo a number of "rendering" processes to shade them to generate their final output colour, etc., values. Such processes to derive the output data values may be referred to as "fragment shading" or "pixel shading" and are carried out in a fragment shading (also called a pixel shading) stage of the processing pipeline.

As is known in the art, one common technique involves controlling the graphics processing system to generate and store an array of graphics data in a first rendering pass. Then, in a subsequent rendering pass, e.g. in which the scene is processed for its final display, the array of graphics data is used, e.g. as a texture, e.g. to generate the final output colour values for display. Textures may be used in this manner, for example, to provide data that relates to views of the scene from different angles, such as a shadow maps.

FIG. 1 shows an exemplary graphics data generation process. In FIG. 1 a scene 1 to be rendered is being viewed from a viewpoint 2. However, the scene is also to be illuminated by two light sources 3, 4.

As is known in the art, in order to apply the effects of the light sources 3, 4 on the scene when it is displayed, so called "shadow maps" (which are a form of texture map) in respect of each light source will be applied to the rendered image. In order to generate a shadow map, the scene will typically be rendered in a first pass as if viewed from the position of the light source to which the shadow map corresponds, so as to generate a texture map that can then be applied to the scene to in effect represent the effect of the shadows cast by the light source when viewed from the viewpoint for the scene.

Thus in the case of the scene shown in FIG. 1, the graphics processor will first be controlled to render the scene in relation to the light source 4, so as to generate a shadow map 5 representing the effect of that light source on the scene, and to store the shadow map 5 in memory. Then the graphics processor will similarly be controlled to render the scene in relation to the light source 3, so as to generate a shadow map 6 representing the effect of that light source on the scene, and to store the shadow map 6 in memory.

Then, the scene will be rendered for its final display, the rendering process will read the generated shadow maps 5, 6 from memory, and use them for the scene as it is rendered, in order to reflect the effect of the light sources 3, 4 on the scene as it is viewed from the viewpoint 2.

In other words, the rendering of the scene for display will use the previously generated shadow maps 5, 6, so as to apply the effects of the light sources 3, 4 on the scene as it is displayed.

In these methods, it is necessary to provide and allocate sufficient memory to store all the intermediate graphics data (e.g. the texture maps, etc.) that is generated when rendering the scene. This can create a relatively large overhead in terms of the memory footprint required to store all the data required for a scene. Equally, the processes of writing the intermediate data to memory, and subsequently reading it from memory when it is needed (e.g. when processing the scene for final display), can be expensive in terms of bandwidth and power consumption.

The Applicants believe therefore that there remains scope for improvements to techniques for processing graphics data, and in particular in arrangements where intermediate graphics data, such as textures, are to be generated and used when rendering frames for output.

BRIEF DESCRIPTION OF THE DRAWINGS

A number of embodiments of the technology described herein will now be described by way of example only and with reference to the accompanying drawings, in which.

Like reference numerals are used for like components in the drawings, where appropriate.

DETAILED DESCRIPTION

Figure 1:
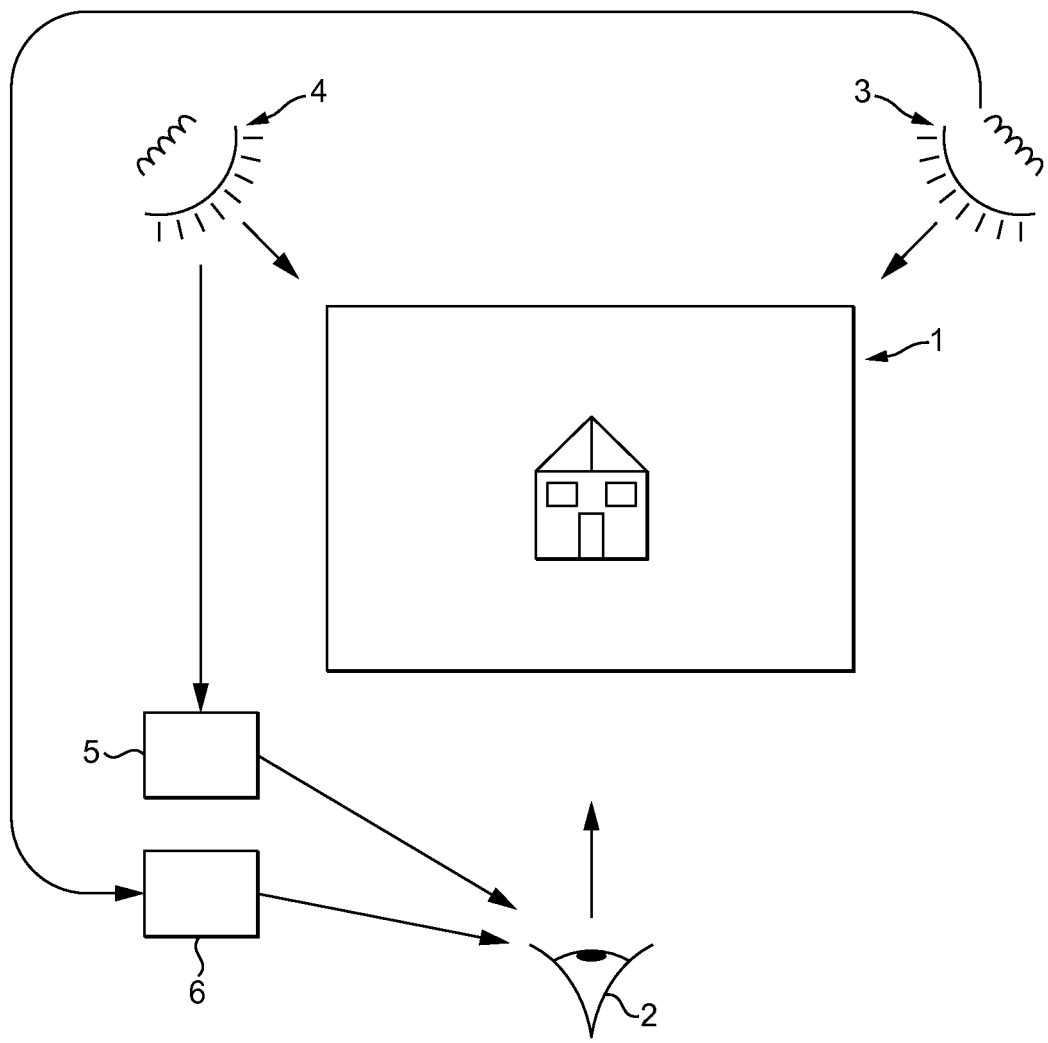
FIG. 1 shows schematically a technique for generating texture data, in accordance with embodiments of the technology described herein.

A first embodiment of the technology described herein comprises a method of operating a graphics processing system when processing graphics data for output, the method comprising:

generating in a first rendering pass an array of graphics data to be used in a subsequent rendering pass;

in the first rendering pass, determining one or more regions of the array of graphics data that have a particular characteristic, and generating information indicative of the one or more regions;

using the array of graphics data generated in the first rendering pass in a subsequent rendering pass; and in the subsequent rendering pass, using the information indicative of the one or more regions to control the reading of the array of graphics data when it is to be used in the subsequent rendering pass.

A second embodiment of the technology described herein comprises a graphics processing system, the graphics processing system comprising:

a graphics processor; and a memory for storing data to be used by and generated by the graphics processor; and wherein:

the graphics processor is configured to:

generate in a first rendering pass an array of graphics data to be used in a subsequent rendering pass and to store the generated array of graphics data in the memory;

in the first rendering pass, determine one or more regions of the array of graphics data that have a particular characteristic, and generate information indicative of the one or more regions;

use the array of graphics data generated in the first rendering pass in a subsequent rendering pass; and in the subsequent rendering pass, use the information indicative of the one or more regions to control the reading of the array of graphics data when it is to be used in the subsequent rendering pass.

The technology described herein is concerned with graphics processing methods and systems in which an array of graphics data is generated in a first rendering pass for use, e.g. as a texture, in a subsequent rendering pass. However, unlike in conventional graphics processing systems, in the technology described herein in the first rendering pass, region(s) of the array of graphics data that have a particular characteristic (such as, and in an embodiment, and as will be discussed further below, that comprise or that could comprise "non-default" data (e.g. colour) values) are identified.

Information indicating the identified regions is then used to control the reading of the array of graphics data in the subsequent rendering pass (e.g. when reading the array of graphics data for use as a texture in the subsequent rendering pass).

For example, and in an embodiment (and as will be discussed further below), the graphics processor can be (and in an embodiment is) controlled only to read data from the stored array of graphics data in the subsequent rendering pass (when using the array of graphics data), if the region of the array that is required falls within the indicated region(s) having the particular characteristic (or vice-versa). Conversely, if the region of the array that is required falls outside the indicated region(s) having the particular characteristic then the graphics processor is in an embodiment controlled not to read data from the stored data array, but to instead perform some other operation, such as (and in an embodiment) to apply a "default" data value (e.g. colour) (as will be discussed further below) (or vice-versa). This then facilitates reducing the number of read operations when using the data array in a subsequent rendering pass, thereby causing savings in memory bandwidth, power and increasing performance when compared to conventional arrangements that simply read the entire array of graphics data.

In this regard, the Applicants have recognised that it will often be the case that some regions of an array of graphics data generated in a first rendering pass for use in a subsequent rendering pass will consist of the same data (e.g. colour) value (or a small number of similar data (e.g. colour) values). For example, in embodiments where the array of graphics data is a shadow map, the array of graphics data will typically comprise certain regions where shadow is present, and other regions where no shadow is present. The data positions in the array of graphics data for the "shadowless" regions will take the same data value (or a small number of similar data values) appropriate to indicate that no shadow is present, whereas the data positions in the array of graphics data for the shadow regions may take a (wider) variety of other data values appropriate to indicate that shadow may be present.

The Applicants have further recognised that it is accordingly then not necessary for the graphics processor to read data values from the stored data array in those regions of the data array that consist of the same (or sufficiently similar) data values, but rather it can, for example, instead "apply" those regions of the data array in a subsequent rendering pass simply by using a predefined default data (e.g. colour) value for those regions (as will be discussed further below). This then facilitates not having to read those regions of the array of graphics data from memory that it has been determined would consist of the same data values, such that the number of read operations required when using the array of graphics data in a subsequent rendering pass (e.g. when applying the data array as a texture in a subsequent rendering pass) can then be reduced.

The technology described herein exploits this recognition to avoid, e.g., reading regions (areas) of an array of graphics data that it is known should comprise the same data value, thereby saving power and increasing performance.

The array of graphics data generated in the first rendering pass may comprise any suitable and desired array of graphics data that is to be used in a subsequent rendering pass. In an embodiment it is an array of graphics data that is to be used as a texture in a subsequent rendering pass (as a texture map). The array of graphics data will in an embodiment comprise an array of plural data positions, with each data position taking a particular data (e.g. colour) value. In various embodiments, the array of graphics data may be used to create effects such as shadows and more complex light volumes and lighting effects. The array can comprise, for example, a colour buffer, a depth buffer, a stencil buffer, an image, a normal map, a bump map, a shadow map, a displacement map, etc.

The first rendering pass in which the array of graphics data is generated and the subsequent rendering pass in which the array of graphics data is used are in an embodiment part of (or all of) a sequence of rendering passes that is being used to generate a particular final output (e.g. output frame) of the graphics processor. In this case, the first rendering pass will, accordingly, be an initial or intermediate rendering pass of the overall graphics processing operation and the array of graphics data will be a set of intermediate data that is used in the graphics processing operation in question. The subsequent rendering pass may then, e.g., be the final rendering pass of the graphics processing operation in question (e.g. the generation of an output frame) (although, as will be discussed below, this need not be the case, and the subsequent rendering pass could be a further intermediate rendering pass that is performed before a "final" rendering pass, if desired).

It would also be possible for the subsequent rendering pass to be a pass that is performed as part of a different graphics processing operation, e.g. for the generation of a later output frame, if desired.

In one embodiment, the first rendering pass is the very first rendering pass in the particular graphics processing operation (e.g. generation of an output frame). However, this need not be the case, and it could instead be a later (but still intermediate) rendering pass in the particular graphics processing operation in question.

Also, as is known in the art, certain graphics processing techniques generate a plurality of arrays of graphics data (e.g. a plurality of textures), before using them (applying them) in a subsequent (e.g. final) rendering pass. For example, in the case of shadow maps, multiple light sources are typically dealt with by generating multiple shadow maps, which are then applied in a final rendering pass.

Thus, in one embodiment the first rendering pass is one of a plurality of first rendering passes. In an embodiment, each of the plurality of first rendering passes generates an array of graphics data, in an embodiment for use in the subsequent rendering pass. In this case, in an embodiment each of one of the plurality of first rendering passes is processed in the manner of the technology described herein.

The array of graphics data that is generated in the (or in each) first rendering pass can be generated in any desired and suitable manner. In an embodiment, it is generated by performing the usual processes and, e.g., calculations that would be required and performed to generate the array of graphics data.

The generated array of graphics data should be and is in an embodiment stored in memory, so that it can then be fetched therefrom and used by the graphics process and/or graphics processing unit in the subsequent rendering pass, and/or in other subsequent graphics processing steps.

The technology described herein operates to determine in the first rendering pass, one or more regions of the array of graphics data that have a particular characteristic.

The particular characteristic that is identified in the first rendering pass can be any suitable and desired characteristic, but in an embodiment the particular characteristic relates to the data values that the data positions in regions of the data array will have or will be likely to have. In an embodiment, regions of the array of graphics data in which all the data positions have, or can be (safely) assumed to have, the same data value, and/or regions of the array of graphics data in which all the data positions do not have or cannot be (safely) assumed to have, the same data value, are identified.

In this regard, the system could operate to identify and indicate, for example, a region or regions of the array of graphics data in which the data positions will or should all have the same (or sufficiently similar) data values, or, conversely the system could operate to identify and indicate a region or regions of the array of graphics data in which the data positions will not have or do not have, or cannot safely be assumed to all have, the same (or sufficiently similar) data values.

Thus, in an embodiment, each region having a particular characteristic that is identified in the array of graphics data is a region for which it is determined that all the data positions may not (safely) be set to a common data value (when the region is to be used (read)), or conversely each region having a particular characteristic that is identified in the array of graphics data is a region for which it is determined that all the data positions may (safely) be set to a common data value (when the region is to be used (read)).

In an embodiment, the identification of the regions having the particular characteristic is done by identifying a region or regions of the array of graphics data for which the data positions could comprise differing data values (e.g. that could comprise differing data values when the array of graphics data is generated). In this case, each region having a particular characteristic that is identified in the array of graphics data would be a region that it is determined comprises or could comprise data positions having differing data values when the array of graphics data is generated.

Conversely, the system could operate to identify regions of the array of graphics data for which the data positions do not comprise differing data values or will not comprise differing data values when the array of graphics data is generated.

The determination of the regions of the array of graphics data that have the particular characteristic can be done in any desired and suitable manner.

In one embodiment, the regions of the array of graphics data are determined by assessing the data values in the array of graphics data, so as to identify regions of the array of graphics data that do not comprise the same (or sufficiently similar) data values, and/or to identify regions of the graphics data that all comprise the same (or sufficiently similar) data values.

For example, the array of graphics may be evaluated after it has been generated to identify (determine) one or more regions of the array that comprise the same or that do not comprise the same data values. This may be done, for example, by controlling the graphics processor (or another processor) to evaluate (scan over) the array of graphics data to determine one or more regions of the array of graphics data that do (and/or do not) comprise the same data values.

In another embodiment, the process does not assess the actual data values of the generated data array themselves, but rather operates to determine a region or regions of the array of graphics data that it cannot be assumed will all have the same data value (or, conversely, that it can be safely assumed will all have the same data value) (i.e. that could comprise differing data values (or, conversely that will not comprise differing data values)) when the array of graphics data is generated. This is in an embodiment based on the processing to be performed when generating the array of graphics data.

As will be explained more fully below, this embodiment provides a particularly useful and advantageous arrangement, because appropriate information may already be available to the graphics processor (e.g. from an earlier stage in the processing) on which the determination can be made. Accordingly, in these embodiments, the overall burden on the graphics processor can be reduced relative to embodiments in which, e.g., the array of graphics is evaluated after it has been generated.

Furthermore, in this embodiment, the determination may be able to be made before the array of graphics data is actually generated (and in one embodiment this is what is done). As will be explained more fully bellow, this can lead to further savings in the amount of processing, power and bandwidth required to complete the operation in question (e.g. to generate the final image for display).

In this regard, the Applicants have recognised that it is possible in some instances to predict which regions of the (to-be-generated) array of graphics data could comprise differing data values (and conversely which regions will comprise the same or similar data values), before the array of graphics data is actually generated.

For example, in embodiments where the array of graphics data is a shadow map, for regions of the array of graphics data where no geometry (primitives) is present, no shadow will be present, and these regions of the (to-be-generated) array will be certain to take the same or similar data values (e.g. corresponding to "no shadow" present). Accordingly, it can be predicted (determined) that these regions will comprise the same or similar data values, before the array of graphics data (the shadow map) is actually generated.

On the other hand, for the regions of the array where geometry (primitives) is present, shadow may (or may not) be present, and these regions of the (to-be-generated) array may take "shadow" and/or "non-shadow" data values. Accordingly, it can be predicted (determined) that these regions could contain differing data values (and conversely it cannot be safely assumed that these regions will contain the same data value), before the array of graphics data is actually generated.

Thus, in embodiments, the determination of the region or regions of the array of graphics data having the particular characteristic is made before the array of graphics data is generated, in an embodiment by considering the processing to be performed to generate the array of graphics data, and in an embodiment by considering the distribution of geometry (e.g. primitives) to be processed for the array of graphics data.

Thus in an embodiment, the determining of one or more regions of the graphics data array that have a particular characteristic comprises determining one or more regions of the array of graphics data that contain geometry to be processed when generating the array of graphics data.

In these embodiments the determining of a region or regions of the graphics data array that "contain" processing to be performed (e.g. geometry to be processed) to generate the array of graphics data can be made in any suitable or desired manner.

For example, where the system already determines which areas of the data array comprise geometry, then that information can be and is in an embodiment used in the determination. For example, in embodiments where "tiling" is used, tile lists generated by the tiling process, or information derived therefrom, may be and are in an embodiment used in the determination.

Thus, in an embodiment determining one or more regions of the array of graphics data that have a particular characteristic comprises evaluating information indicating one or more regions of the array of graphics data that comprise (contain) geometry, such as primitives, to be processed for the array of graphics data. Equally, the information indicative of the one or more regions may be derived from information indicating one or more regions of the array of graphics data that comprise (contain) geometry, such as primitives, to be processed for the array of graphics data.

Thus, in one embodiment, the regions of the array of graphics data that have the particular characteristic are identified (determined) by sorting data (e.g. and in an embodiment, the geometry and/or graphics entities) to be used for the generation of the array of graphics data, e.g., and in an embodiment by location or position, and in an embodiment by tiling the data (e.g. geometry) that is to be used for the generation of the array of graphics data.

In these arrangements, the sorting (e.g. tiling), etc., of the data (e.g. geometry) to be used by the data generation process will generally already have been carried out prior to the generation of the data array. Thus, the process of the technology described herein can use and take advantage of this already performed sorting (e.g. tiling), of the data, etc.

Thus, in an embodiment, the technology described herein can and in an embodiment does include sorting, in an embodiment tiling, data (and in an embodiment geometry) to be used in the generation of the array of graphics data, in an embodiment on the basis of positions or locations in the array associated with the data (e.g. geometry) and/or which the data (e.g. geometry) is known to affect. Information from this sorting process is in an embodiment then used to identify and/or to indicate the region(s) having the particular characteristic.

Where data is sorted, e.g., tiled, then as will be appreciated by those skilled in the art, the sorting (e.g. "tiling") process can be carried out as desired, for example in the case of tiling using any desired tile size and shape, and exact binning or bounding box binning (or any other sorting technique), as desired, etc.

It would be possible to determine for a data array plural separate regions that have the particular characteristic (e.g. (potentially) varying data values), but in an embodiment, a single region having the particular characteristic is determined and indicated for the data array being considered.

The region (or regions) of the array of graphics data can take any suitable and desired form and be represented in any desired and suitable manner.

Each region is in an embodiment in the form of a bounding box that encompasses an area (the relevant area) of the data array (and accordingly will comprise one or more (and in an embodiment plural) individual data positions of the array of graphics data).

The bounding box can be derived as desired. For example, it could be based on the actual data positions themselves that the region covers (e.g. where the actual data values in the data array are assessed to identify the region having the particular characteristic), or, for example, the bounding box could be derived, e.g., by considering the positions of the, e.g. tiles, that it has been determined contain geometry to be processed for the data array.

The information indicative of the region or regions having the particular characteristic that is generated and then used in the subsequent rendering pass can take any suitable and desired form. This information in an embodiment indicates the data positions within the array that the region encompasses (covers).

In one embodiment, the information may comprise a bitmap indicating the data positions of the data array that the region occupies.

In an embodiment, the extent of the region (or of each region) of the data array having the particular characteristic is indicated as ranges of data positions along respective directions within the data array. This may reduce the amount of "region indicating information" that needs to be stored by the graphics processor. In an embodiment an axis-aligned bounding box is indicated (so, e.g., the region is defined in terms of minimum and maximum values along each of the x and y axes (e.g.)).

In another embodiment, the region (or each region) is represented as (indicated as) a set of one or more sub-regions of a set of sub-regions that the array of graphics data has been divided or partitioned into. In this case, the information indicative of the region could, e.g., indicate which sub-regions of the set of sub-regions that the array of graphics data has been divided into are part of the region (e.g. in the form of a bitmap indicating the sub-regions in question), or, for example, the range of sub-region positions along respective directions within the data array (e.g. along each of the x and y axes) could be indicated.

In these arrangements the array of graphics data may be divided or partitioned into a plurality of identifiable smaller sub-regions, each representing a part of the overall array of graphics data, as desired. Each sub-region in an embodiment represents a different part of the array of graphics data and should comprise a set of plural data positions of the array of data. Each sub-region is in an embodiment the same size and shape, although this is not essential. In an embodiment each sub-region is rectangular (and in an embodiment square). Suitable sizes for the sub-regions would be, e.g., 8×8, 8×16, 16×8, 16×16 or 32×32 data positions in the array of graphics data.

In a particular such embodiment, the graphics processing system is a tile-based graphics processing system and the sub-regions correspond to the tiles that the data array is divided into for the rendering process (that the graphics processor produces as its rendering output).

In another embodiment, the data array sub-regions that are considered in these embodiments of the technology described herein each correspond to a set of plural "rendering" tiles, in an embodiment an integer set of tiles. This may reduce the amount of "sub-region indicating information" that needs to be stored by the graphics processor, albeit at the expense of a lower resolution (more coarse grained) division of the data arrays.

Thus, in one embodiment, the one or more regions comprise a number of, or one or more sub ranges of, a plurality of tiles that the array of graphics data has been divided or partitioned into.

The information indicative of the identified one or more regions of the data array having the particular characteristic should be and is in an embodiment stored in an appropriate manner for use in the subsequent rendering pass. This information can be stored where and as desired. It is in an embodiment stored locally to the graphics processor (e.g. in an appropriate on-chip memory).

The information indicative of the identified one or more regions of the data array having the particular characteristic is in an embodiment stored in association with the data array, e.g. as a region descriptor associated with the data array that indicates, e.g., and in an embodiment, a bounding box for the identified region, e.g. in terms of minimum and maximum x position values and minimum and maximum y position values and/or in the form of a bitmap indicating the data positions of the data array that the region occupies and/or in the form of a tile bitmap indicating the tiles of the data array that the region occupies.

The subsequent rendering pass may be any suitable and desired rendering pass that uses the array of graphics data generated in the earlier (first) rendering pass. The subsequent rendering pass may be any rendering pass that takes place after the first rendering pass. In one embodiment, the subsequent rendering pass is the next rendering pass that is carried out by the graphics processor immediately after the first rendering pass, but in other embodiments other rendering passes (e.g. one or more other first rendering passes) may be carried out between the first rendering pass and the subsequent rendering pass.

In one embodiment, the subsequent rendering pass is an intermediate rendering pass, and one or more further rendering passes may be carried out by the graphics processor after the subsequent rendering pass (and these further rendering passes may, e.g., use the output (array of graphics data) from the subsequent rendering pass, e.g. as a texture, if desired).

In an embodiment, the subsequent rendering pass is a "final" rendering pass in which the final output of the sequence of rendering passes (the graphics processing operation in question) is generated, e.g. an output frame for display.

The final output of the graphics processing operation (sequence of rendering passes) in question (e.g. of the subsequent rendering pass where that is the "final" rendering pass) may be any suitable and desired output that a graphics processor may be used to generate. In one embodiment it comprises an output frame for display, but it may also or instead comprise other outputs of a graphics processor such as a graphics texture (where, e.g., the render target is a texture that the graphics processor is being used to generate (e.g. in "render to texture" operation) or other surface to which the output of the graphics processor is to be written.

Similarly, although the above operation has primarily been described with reference to one particular sequence of rendering passes (graphics processing operation), it will be appreciated that the technology described herein can be and is in an embodiment used for plural graphics processing operations, e.g. for each and every output frame in a sequence of output frames that is being generated (where it is appropriate to do that). (Thus one or more further "first", "intermediate" and/or "final" rendering passes will typically be carried out to generate subsequent graphics outputs, e.g. frames).

The subsequent rendering pass can use the array of graphics data generated in the earlier (first) rendering pass in any suitable and desired manner (e.g. depending upon what information the array of graphics data represents). Thus, where the array of graphics data comprises a texture, it is in an embodiment used in the subsequent rendering pass by applying the texture to fragments for geometry (e.g. primitives) that is being rendered in the subsequent rendering pass.

The data array is in an embodiment used and applied using the texture mapping process of the graphics processing pipeline in the subsequent rendering pass.

The information indicative of the one or more regions of the array of graphics data that have a particular characteristic can be used to control the reading of the array of graphics data when it is to be used in the subsequent rendering pass in any suitable and desired manner. In an embodiment, the information is used to control which data positions of the array of graphics data are read from memory.

In an embodiment, if the data position of the array of graphics data whose value is required in the subsequent rendering pass falls within an indicated region of the array that has the particular characteristic, then the data value for the position in question is determined by reading one or more data values from the stored graphics data array in memory, but if the data position that is required falls outside the indicated region or regions of the data array, the data value for the data position is not read from the graphics data array (or vice-versa).

Thus, in an embodiment only those data positions of the array of graphics data indicated by the information are read from memory (or vice-versa). As discussed above, this brings savings in power and increases performance when compared to reading the entire array of graphics data from memory.

Furthermore, in the case where a data position is determined to be a data position for which the graphics data array should not be read, then in an embodiment, the graphics processor instead performs some other operation in respect of such data positions. In an embodiment it operates to use or apply a defined, "default" or "clear" data value for such data positions.

Thus in an embodiment, one or more particular, selected (default) data values are in an embodiment used in the subsequent rendering pass for those data positions of the array of graphics data that are not read from memory (i.e. for those data positions of the array of graphics data that do not form part of the one or more regions (or vice versa)).

In this case, the "default" data value that is used could simply be a predefined default data value, e.g. that is set for the graphics processing operation as a whole.

However, in an embodiment, each data array that is generated has its own, respective, defined "default" data value that is to be used for those data positions of the array of graphics data that are not read from the generated array of graphics data when the array is being used in a subsequent rendering pass. In this case therefore, in an embodiment, a "default" data value to be used for the graphics data array is stored (and in an embodiment also determined) in the first rendering pass, for use when the graphics data array is to be used in a subsequent rendering pass.

Thus, in an embodiment as well as the data indicating the region of the data array having the particular characteristic, the graphics processor also determines in the first rendering pass, and stores in association with the data array, a data value to be used for any data position in the data array that falls outside the indicated region or regions (where the indicated region or regions are regions that it has been determined will (potentially) contain differing data values), or, conversely, that is to be used for all data positions within the indicated region or regions (where the indicated region or regions indicate regions of the data array that have been determined to have the same, common data value). This data value will accordingly essentially be a "default" or "clear" data value that is to be used for those positions in the data array that it has been determined in the first rendering pass the data array will contain (can safely use) that same data value.

For example, as discussed above, in embodiments where the array of graphics data comprises a shadow map, data positions for "shadowless" regions in the array of graphics data will take on one or more "default" or "standard" data values that indicate that no shadow is present. In contrast, data positions for shadow regions will take on data values other than the one or more "no shadow" values, that are appropriate to indicate that shadow may be present.

The "default" data value can be determined in any suitable and desired manner, for example based on or derived from the particular graphics processing operation for which the array of graphics data is being generated and used, e.g. taken from the particular instructions that the graphics processor is carrying out.

Other data could also be stored in association with the data array, if desired. For example, the data array may have and in an embodiment does have associated with it a data array descriptor that, for example, indicates where and how the data array is stored, and includes pointers to the data indicating the determined region or regions, and to the data indicating the "default" data value to be used for the data array.

Thus, in an embodiment, the operation in the subsequent rendering pass when the array of graphics data is being used comprises, for a data position within the array of graphics data whose value is required when the array of graphics data is being used in the subsequent rendering pass:

using the information indicative of the one or more regions of the array of graphics data that have a particular characteristic to determine whether the data position within the array of graphics data falls within a region of the array of graphics data that has the particular characteristic, and:

if the data position is determined to fall within an indicated region of the array of graphics data that has the particular characteristic, reading the stored array of graphics data to determine the data value to use for the data position, but if the data position is determined not to fall within a region of the array of graphics data that has the particular characteristic, not reading the stored array of graphics data to determine the data value to use for the data position, but instead using a defined data value for the data value for the data position.

The converse operation would equally be possible, if desired (e.g. depending on how the regions are determined and/or what they represent), namely if the data position is determined not to fall within an indicated region of the array of graphics data that has the particular characteristic, reading the stored array of graphics data to determine the data value to use for the data position, but if the data position is determined to fall within a region of the array of graphics data that has the particular characteristic, not reading the stored array of graphics data to determine the data value to use for the data position, but instead using a defined data value for the data value for the data position.

The information indicative of the one or more regions of the array of graphics data that have a particular characteristic can be used in the subsequent rendering pass to identify the data positions that fall within (or that do not fall within) the indicated regions in any suitable and desired manner. For example, where the regions are indicated in terms of ranges and positions within the graphics data array, then those ranges can, e.g., be used to determine and define a suitable range or ranges of texture coordinates for which the actual data array should be read in the texture mapping process.

Alternatively, where, for example, the region or regions having the particular characteristic are indicated in the form of tile bitmaps, for example, the graphics processing pipeline (e.g. texture mapper) could be configured to use that bitmap to determine whether a data position in the data array for which the data value is required falls within a region indicated as having the particular characteristic or not.

It should be noted in this regard that at least in the case where each determined region having a particular characteristic is a region having (potentially) differing data values, then a determined region may include data positions of the array of graphics data that have the "default" data value that the data array outside the identified region or regions will take, as well as data positions having other, "non-default" data values (i.e. the identified and indicated region or regions having the particular characteristic do not need to (and typically will not) contain exclusively "non-default" data values).

The Applicants have furthermore recognised that the determination of the one or more regions of the array of graphics data that have a particular characteristic in the technology described herein can not only be used when "consuming" the array of graphics data in the manner discussed above, but can also be advantageously used when generating the array of graphics data in the first place. This is possible because, as discussed above, in an embodiment, the determination is made before the array of graphics data is generated.

Accordingly, in an embodiment, the operation of the technology described herein further comprises controlling the generation of the array of graphics data in the first rendering pass based on the determination of the one or more regions of the array of graphics data that have a particular characteristic. This may be done in any suitable and desired manner, but in an embodiment the determination is used to control which region or regions of the array of graphics data are generated (e.g. which region or regions are processed, rendered, and written to memory) in the first rendering pass.

For example, in one embodiment only those regions of the array of graphics data that are determined to have the particular characteristic are generated, and any other regions are not generated (or vice versa). This is possible because, as discussed above, only the regions that are determined to have (or not to have) the particular characteristic will need to be read when using the array of graphics data in the subsequent rendering pass. Thus, only those regions need to be generated in the first place.

Thus, for example, in embodiments where the array of graphics data is a shadow map, as discussed above, the array of graphics data will typically comprise certain regions where shadow is present, and other regions where no shadow is present. In these embodiments, only those regions of the array of graphics data where shadow is (or cannot be safely assumed not to be) present will need to be generated, because only these regions will be read in the subsequent rendering pass.

Thus, in an embodiment, the operation of the technology described herein further comprises, for a region of the array of graphics data determined to have the particular characteristic, generating that region of the data array, and for parts of the data array not determined to have the particular characteristic, not generating those parts of the data array (or vice versa).

In these embodiments, the determination of the one or more regions of the array of graphics data that have a particular characteristic is used to control the generation of the array of graphics data itself. This then means that, in effect, the graphics processor can be controlled to process only the regions of the array of graphics data determined to have (or not to have) the particular characteristic, such that any regions outside of these regions will not need to be generated (i.e. processed, rendered or written back to memory), thereby causing savings in power and increasing performance when compared to generating the entire array of graphics data. This can also reduce the memory footprint required for storing the array of graphics data.

As discussed above, in an embodiment a default data value is stored in association with the data array for use for those parts of the data array that are not generated in the first rendering pass.

It is believed that the use of the determination of the one or more regions of the array of graphics data that have a particular characteristic to control the generation of the array of graphics data may be new and advantageous in its own right, and not just when the reading of the array of graphics data in a subsequent rendering pass is controlled.

Thus, a third embodiment of the technology described herein comprises a method of operating a graphics processing system when processing graphics data for output, the method comprising, when an array of graphics data to be used in a subsequent rendering pass is to be generated in a first rendering pass:

in the first rendering pass, determining one or more regions of the array of graphics data that have a particular characteristic; and controlling the generation of the array of graphics data based on the determination.

A fourth embodiment of the technology described herein comprises a graphics processing system, the graphics processing system comprising:

a graphics processor; and a memory for storing data to be used by and generated by the graphics processor; and wherein:

the graphics processor is configured to:

generate in a first rendering pass an array of graphics data to be used in a subsequent rendering pass and to store the generated array of graphics data in the memory; and to:

in the first rendering pass, determine one or more regions of the array of graphics data that have a particular characteristic; and to control the generation of the array of graphics data based on the determination.

As will be appreciated by those skilled in the art, these embodiments can and in an embodiment do include any one or more or all of the optional features of the technology described herein.

Thus, for example, the determining of the one or more regions of the array of graphics data that have a particular characteristic is in an embodiment performed in one of the manners discussed above. In an embodiment one of the processes for this determination discussed above that can identify the regions of the array graphics data in advance of the array of graphics data actually having to be generated is used for this purpose.

Similarly, the determination is in an embodiment used to control which region or regions of the array of graphics data are generated in the first rendering pass such that regions of the array of graphics data determined to have the particular characteristic are generated in the first rendering pass, while parts of the data array determined not to have the particular characteristic are not generated (or vice versa).

The array of graphics data generated in the first rendering pass is in an embodiment used in a subsequent rendering pass, and, in one embodiment, information indicative of the one or more regions is generated in the first rendering pass, and the information is in an embodiment used in the subsequent rendering pass to control the reading of the array of graphics data, e.g. in the manner discussed above.

Also, a default data value is in an embodiment stored in association with the data array as part of the first rendering pass for use for those parts of the array of graphics data that are not generated in the first rendering pass.

The graphics processing system of or for use with the technology described herein can take any suitable form. As will be appreciated by those skilled in the art, it can and should comprise, as well as the particular components or features necessary to operate in accordance with the technology described herein, the other features and components necessary to allow it to process the graphics data for display. Thus in an embodiment it comprises, e.g., one or more of a (programmable) vertex shader unit or units, a (programmable) fragment shader unit or units, rasterising unit(s), rendering unit(s) (including, e.g., texture mapping, varying interpolators, and/or blending units, etc.), etc., as is known in the art.

Where generated data (e.g. an array of graphics data, information indicative of one or more regions, information indicating a default data value, etc.) is to be stored, then the data can be stored in any desired and suitable manner. In an embodiment, the generated data is stored in a cache memory or memories of or accessible to the graphics processor or system, etc. It would, of course, be possible to also or instead store the data in non-cache, e.g., main, memory, if desired. Again, any suitable and desired memory scheme can be used for the data as desired.

The determination of the regions having the particular characteristic and the generation of the information relating thereto, such as the data array descriptor as discussed above, can be performed by any suitable component or components of the graphics processing system. Thus, for example, the tiler of the graphics processing system could determine the region or regions of the data array having the particular characteristic, and then write out the appropriate information (e.g. data array descriptor) directly. Alternatively, the information (e.g. descriptors) could be generated via an appropriate software process. Similarly, it would, if desired, be possible to, instead of generating the regions using hardware, perform a software pass which, e.g. performs projection based on a bounding volume, to do this.

The technology described herein can be implemented in any suitable system, such as a suitably configured microprocessor based system. In an embodiment, the technology described herein is implemented in a computer and/or micro-processor based system.

The technology described herein is particularly, but not exclusively, suitable for use in low power and portable devices. Thus, in an embodiment, the technology described herein is implemented in a portable device, such as a mobile telephone or PDA.

The technology described herein is applicable to any suitable form or configuration of graphics processor. It is particularly applicable to tile-based graphics processors and graphics processing systems. Thus in an embodiment, the graphics processor is a tile-based processor.

The technology described herein accordingly also extends to a graphics processor and/or a graphics processing system or platform, that includes the system or apparatus of the technology described herein, and/or that can be operated in accordance with one or more of the methods of the technology described herein. Subject to any hardware necessary to carry out the specific functions discussed above, such a graphics processor, etc., can otherwise include any one or more or all of the usual function/units etc., that graphics processors include.

The various functions of the technology described herein can be carried out in any desired and suitable manner. For example, the functions of the technology described herein can be implemented in hardware or software, as desired. Thus, for example, unless otherwise indicated, the various functional elements and "means" of the technology described herein may comprise a suitable processor or processors, controller or controllers, functional units, circuitry, processing logic, microprocessor arrangements, etc., that are operable to perform the various functions, etc., such as appropriately dedicated hardware elements and/or programmable hardware elements that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Subject to any hardware necessary to carry out the specific functions discussed above, the graphics processing system and pipeline can otherwise include any one or more or all of the usual functional units, etc., that graphics processing pipelines include.

It will also be appreciated by those skilled in the art that all of the described embodiments of the technology described herein can, and in an embodiment do, include, as appropriate, any one or more or all of the optional features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or graphics processing system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

A number of embodiments of the technology described herein will now be described. The embodiments relate to a graphics processing system, in which a texture is generated in a first rendering pass for use in a subsequent rendering pass.

Figure 2:
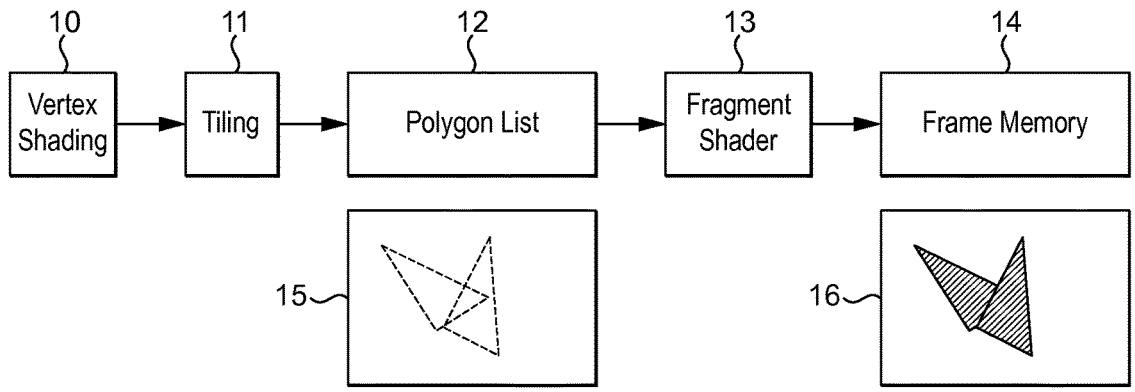
FIG. 2 shows schematically the operation of a prior art rendering pipeline.

FIG. 2 shows schematically a conventional tile-based graphics processing system. The figure shows the main elements of the graphics processing pipeline that are relevant to the operation of the technology described herein. As will be appreciated by those skilled in the art there may be other elements of the graphics processing system that are not illustrated in FIG. 2.

As shown in FIG. 2 the graphics processing pipeline includes three main functional units (processing stages), a vertex shader 10, a tiler 11, and a fragment shader 13. These processing stages use and process data that is stored in various data arrays, and buffers, including a polygon list array 12 and a frame memory 14. In FIG. 2, the clear boxes represent hardware units (processing stages) of the graphics processing system, and the shaded boxes are memory buffers or data structures. The solid arrows show data flow between the various stages.

It should be noted here that FIG. 2 is only schematic, and that, for example, in practice the shown functional units, such as the vertex shader 10, tillers 11, and fragment shader 13, may (and in an embodiment do) share significant or the same hardware circuits, even though they are shown schematically as being separate in FIG. 2.

The vertex shader 10, as is known in the art, takes input data values associated with vertices, etc., defined for an image to be displayed, and processes those data values to generate a set of corresponding "vertex shaded" output data values for use by subsequent stages of the graphics processing system.

The tiler 11, as is known in the art, operates to sort polygons (primitives) for the image being displayed into appropriate polygon lists for each tile of the scene ("tile lists"), so that the fragment shader 13 knows which polygons it is to process for the tile that it is currently working on. The tiler 11 stores in the polygon list array 12 a set of polygon lists (tile lists), which allow the relevant data associated with the vertices of the polygons in the list to be retrieved.

The fragment shader 13 operates, as is known in the art, to first rasterise the polygons in the image to be displayed into individual graphics fragments which are the graphics entities that are then subsequently shaded in order to display the image, and to then perform various fragment shading operations on the rasterised fragments to generate the final versions of the fragments, which it then stores, for example, in appropriate tile buffers, and, for example, then to a frame memory 14.

FIG. 2 also shows representations of the contents of the polygon list array 12 and the frame memory 14 for a simple example in which two polygons (primitives) are processed by the pipeline to generate a texture 16. In this example, the tiler 11 sorts the two polygons (primitives) into a list 15, and stores the list in the polygon list array 12. The polygons are then processed by the fragment shader 13 to generate the texture 16, which is stored in the frame memory 14.

Figure 3:
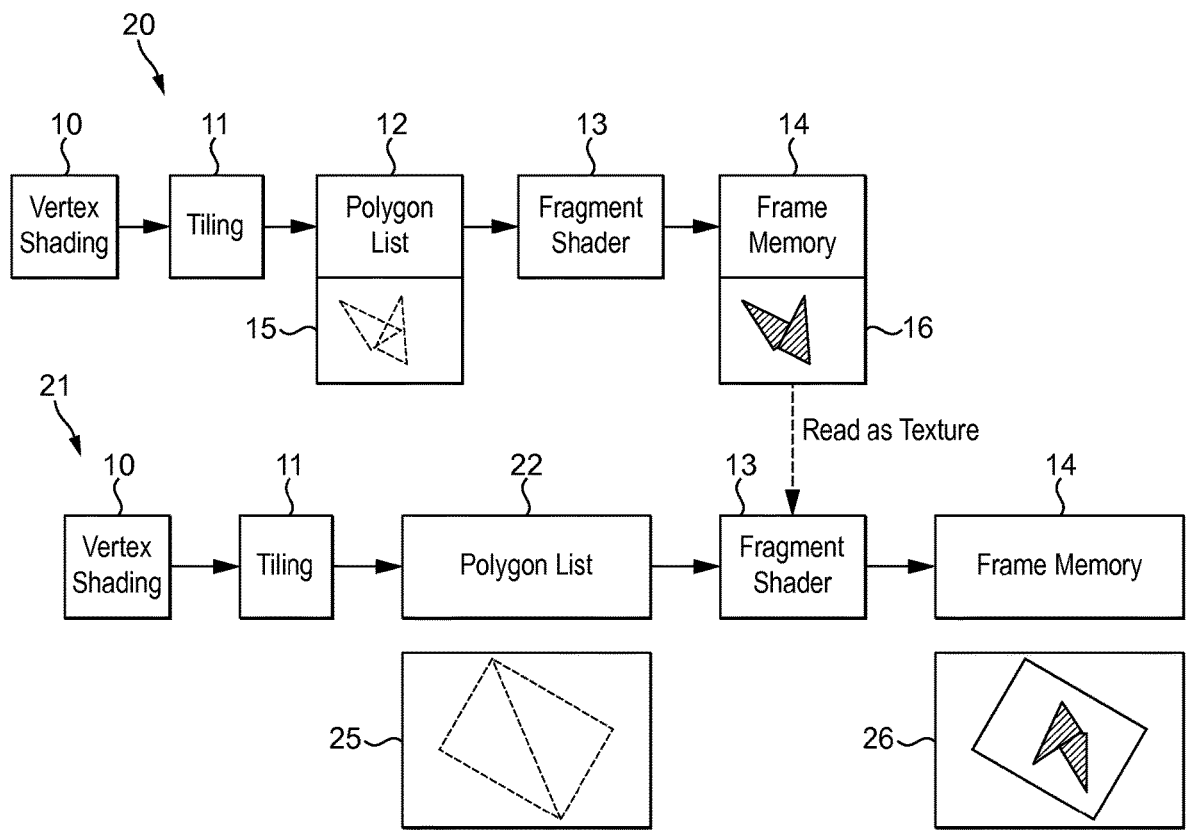
FIG. 3 show schematically the operation of a prior art rendering pipeline whereby a texture is generated in a first rendering pass and is then used in a second rendering pass.

FIG. 3 shows schematically a conventional tile-based graphics processing system that uses multiple rendering passes. Thus, two rendering passes 20, 21 are shown schematically in FIG. 3.

In this example, a first rendering pass 20 is carried out to generate a texture 16 and to store it in frame memory 14, in a corresponding manner to the method discussed above in relation in FIG. 2. The texture 16 is then read from the frame memory 14 and is applied by fragment shader 13 in a subsequent rendering pass 21, when rendering the scene for its final display.

As discussed above, this multi-pass operation may be used, e.g., to apply the effects of light sources on the scene when it is displayed. In this example, the texture 16 stored in frame buffer 14 is a "shadow map" representing the effect of the light source on the scene. In this example, the graphics processor is first controlled to render the scene in relation to the light source, so as to generate shadow map 16, and to store the shadow map 16 in frame memory 14. Then, the scene is rendered for its final display, where the generated shadow map 16 is read from memory 14, and applied to the scene as it is rendered (in the fragment shader 13), in order to reflect the effect of the light source on the scene. The rendered scene 26 is then stored in frame memory 14.

Figure 4:
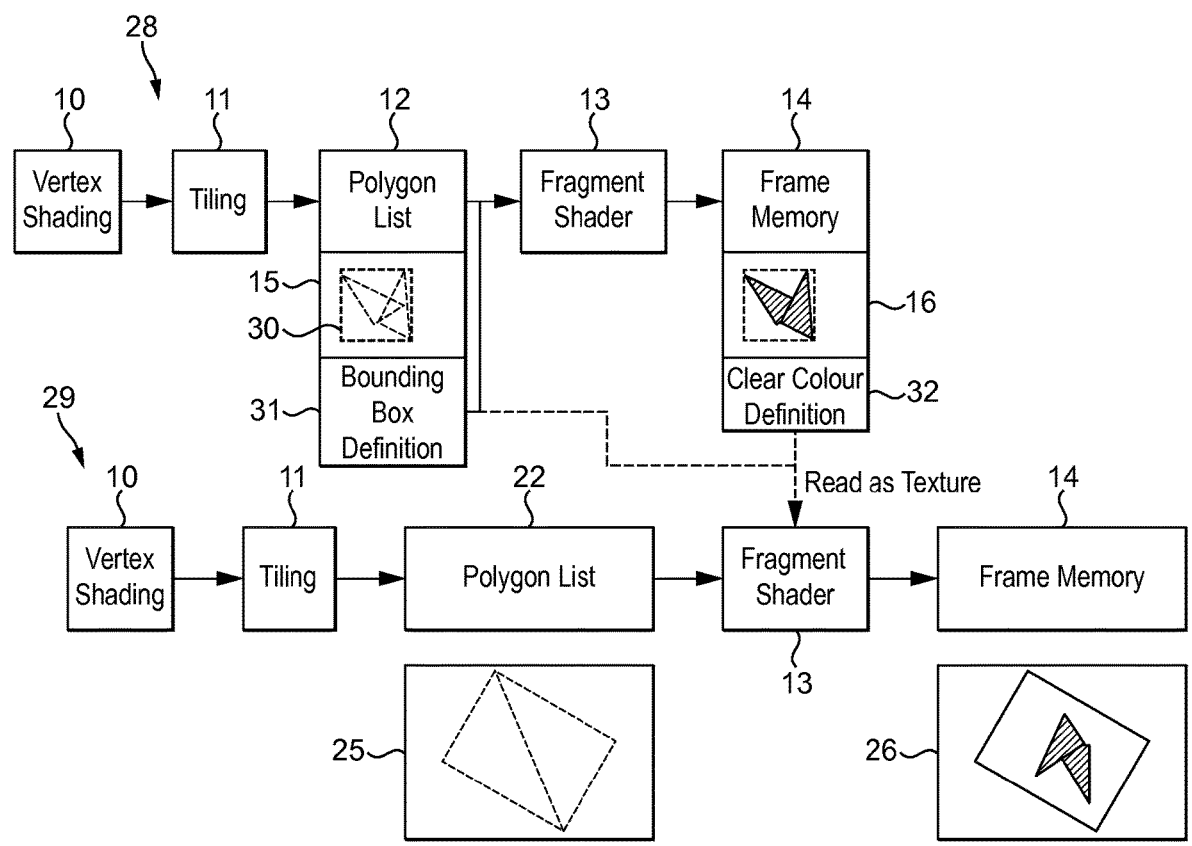
FIG. 4 shows schematically the operation of a rendering pipeline in accordance with an embodiment of the technology described herein.

FIG. 4 shows a modified multi-pass tile-based graphics processing system, that is in accordance with an embodiment of the technology described herein. Elements of FIG. 4 that correspond to elements of FIG. 3 operate in a corresponding manner, with a number of modifications and additions that will now be described.

As discussed above, tiler 11 operates in a first rendering pass 28 to sort primitives for the data array (e.g. shadow map) to be generated in the first rendering pass into tile lists for each tile of the array. The tiler 11 stores in the polygon list array 12 a set of tile lists, one list for each tile of the array. In the present embodiment, the tiler 11 additionally generates a bounding box 30. The bounding box 30 represents the minimum and maximum spatial extent of primitives (i.e. in a first (x) direction and a second (y) direction) in the array. That is, the bounding box 30 comprises minimum and maximum x and y values that encompass all of the primitives present in the array. The minimum and maximum values for the bounding box 30 may be an integer number of data positions (e.g. texels), or an integer number of tiles.

Figure 5:
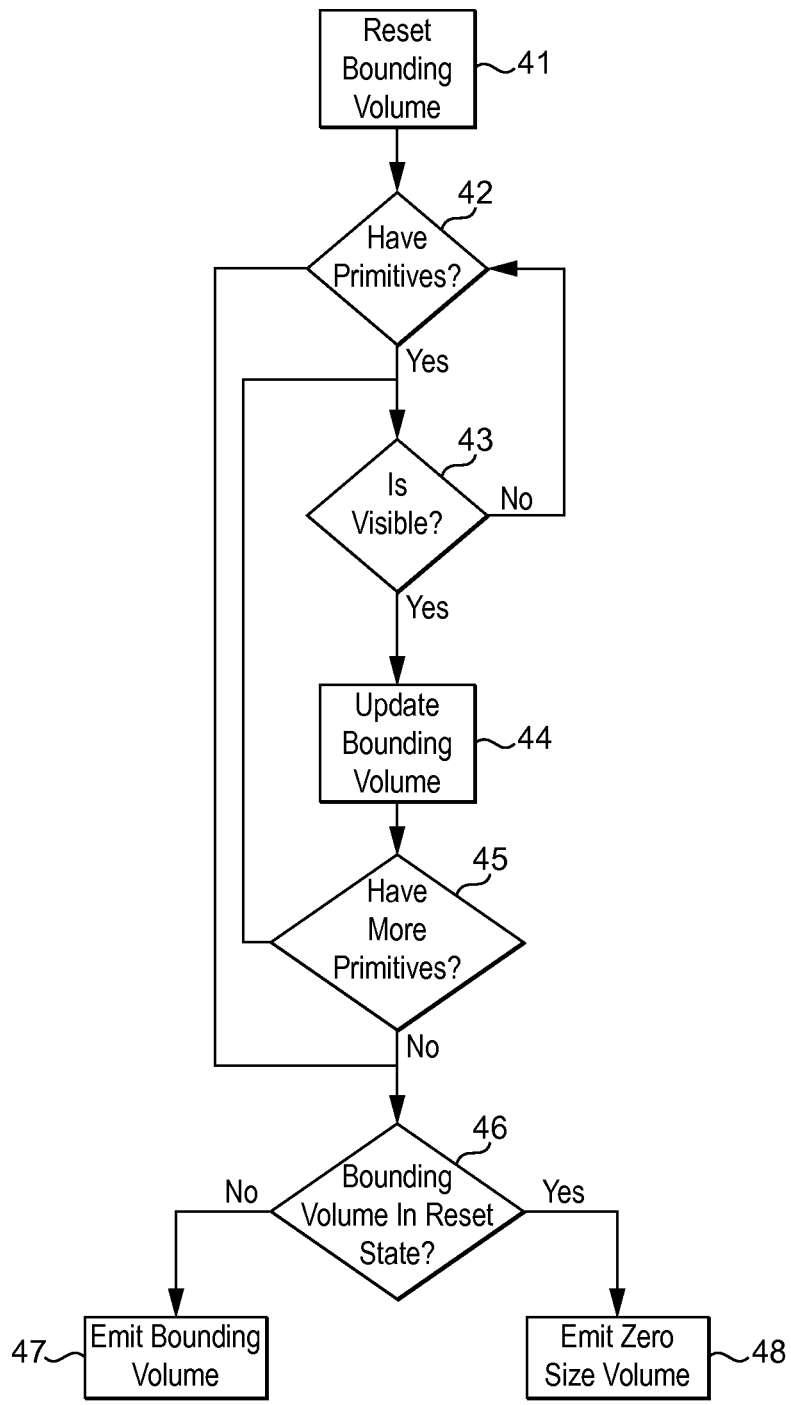
FIG. 5 shows schematically the generation of a bounding volume, in accordance with an embodiment of the technology described herein.

FIG. 5 illustrates a process for generating a bounding box 30 in accordance with the present embodiment, in which the bounding box 30 is generated by evaluating primitives. The bounding box definition is initially reset (step 41). The reset may be implemented, for example, by setting the start state so that "current min=MAX_INT", and "current max=MIN_INT". (When rendering the primitives, by applying rules like "if current_x<x_min then x_min=current_x" there will be no need to check for the reset state in the inner loop.) A determination is made as to whether any primitives are present in step 42. If there are no primitives present, the operation progresses via decision step 46 to step 48, where the operation ends by emitting a "zero size" bounding box. (This is necessary because if there are no primitives present (so that the rendering can be skipped entirely), the "start state" of min=MAX and max=MIN is not useful.)

If it is determined at step 42 that there is at least one primitive present, a bounding box is generated in the following manner. For each primitive, a determination is made as to whether or not the primitive is visible (step 43). This may be done is any suitable manner, as is known in the art. For each primitive that is visible, the spatial extent of the bounding box is updated at step 44 so as to encompass the visible primitive. This process is repeated for each of the remaining primitives, until it is determined that there are no more primitives (step 45). The operation then progresses to step 47 via decision step 46, where the final bounding box is emitted.

Returning now to FIG. 4, a definition 31 of the generated bounding box 30 is stored in the polygon list array 12 along with the tile lists.

In the present embodiment, the fragment shader 13 operates to render only those parts of the data array that are within the bounding box 30 in the first rendering pass 28. Thus, the fragment shader 13 is configured to receive both the tile lists and the bounding box 30, and to render only those parts of the data array that are within the bounding box 30. The results of the rendering (texture 16) are stored in frame memory 14. The data positions of the texture 16 within the bounding box 30 will take defined values, but the data positions outside of the bounding box 30 will be un-defined (because only those regions of the data array within the bounding box 30 are rendered).

In the present embodiment, the fragment shader 13 additionally operates to derive a default colour value (or "clear colour value"), and to store a definition of the default colour value 32 along with the texture 16 in the frame memory 14. As discussed above, the default colour value is the appropriate colour value to be used (applied) in the subsequent rendering pass 29 for those regions of the texture 16 that are not rendered (i.e. for those regions outside of the bounding box 30). The default colour value may comprise, for example, a "clear" colour value corresponding to the colour of a light source, such as a fully transparent white colour, used in generating the texture (e.g. shadow map) 16. The default colour value may be defined by the drawing operation.

In the present embodiment, in the subsequent rendering pass 29, the fragment shader 13 uses the bounding box definition 31, the default colour definition 32, and the texture 16 to effectively reconstruct the full texture, and then applies the reconstructed texture to the image 25 to generate the final image 26 for display.

Figure 6:
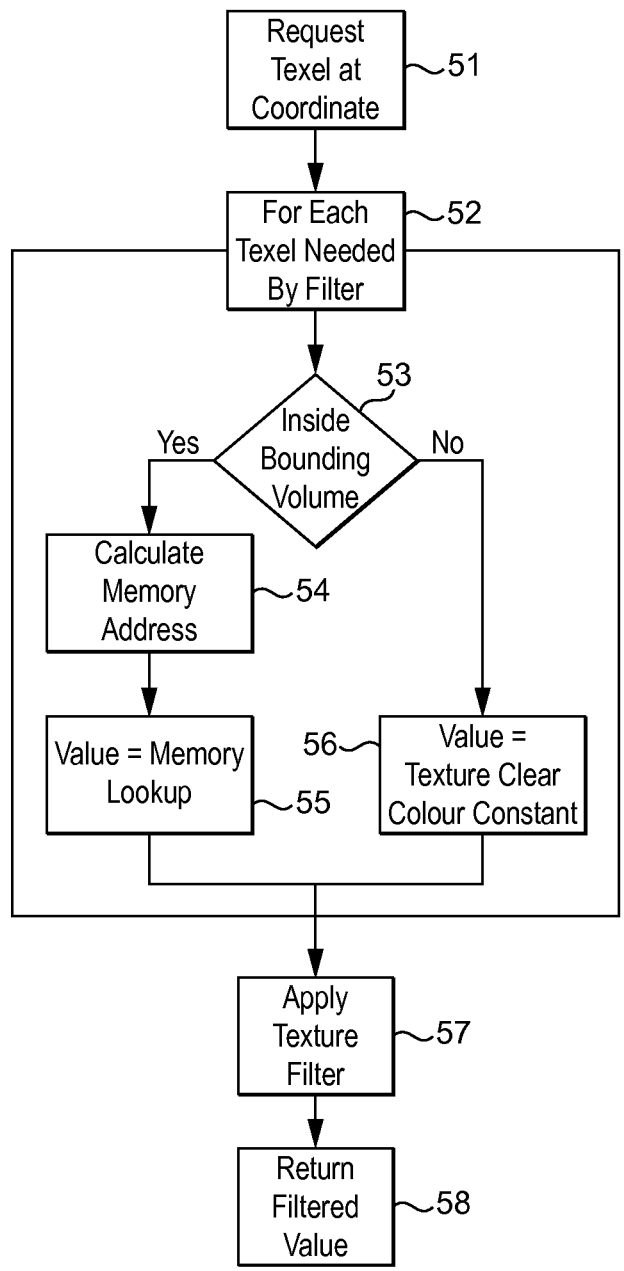
FIG. 6 shows schematically the operation of an embodiment of the technology described herein.

FIG. 6 illustrates the process of "reconstructing" and applying the texture in the subsequent rendering pass in more detail. In the present embodiment, fragment shader 13 requests data for a particular data position (step 51). For each texel of the texture 16 required to generate the data value for the particular data position, a determination is made as to whether the particular texel is inside (or outside) of the bounding box 30. If the particular texel is inside the bounding box 30, the appropriate memory address is calculated (step 54), and the texel value is looked up (step 55). On the other hand, if the particular texel is outside of the bounding box 30, the default (e.g. "clear") data value is instead used (step 56).

It will be appreciated that this arrangement reduces the number of memory accesses, and improves the texture cache performance.

Once all of the texel values required to generate the data value for the particular data position have been determined, the data value is determined (e.g. by applying an appropriate filter) and is returned to the fragment shader 13 in steps 57 and 58. The values returned to the fragment shader 13 are then applied to the image to generate the final image 26 for display, as discussed above.

In an alternative embodiment, rather than generate the bounding box 30 in the manner discussed above, the graphics processor (or other processor) may be configured to scan over an already-generated array (e.g. texture map) to determine a bounding box for use by the fragment shader 13 when using the array (e.g. when applying the texture).

In another alternative embodiment, rather than define the region that should rendered in the first rendering pass and read in the subsequent rendering pass using a bounding box (i.e. minimum and maximum values), a list or bitmap of the individual data positions or tiles may be generated and used.

Figure 7:
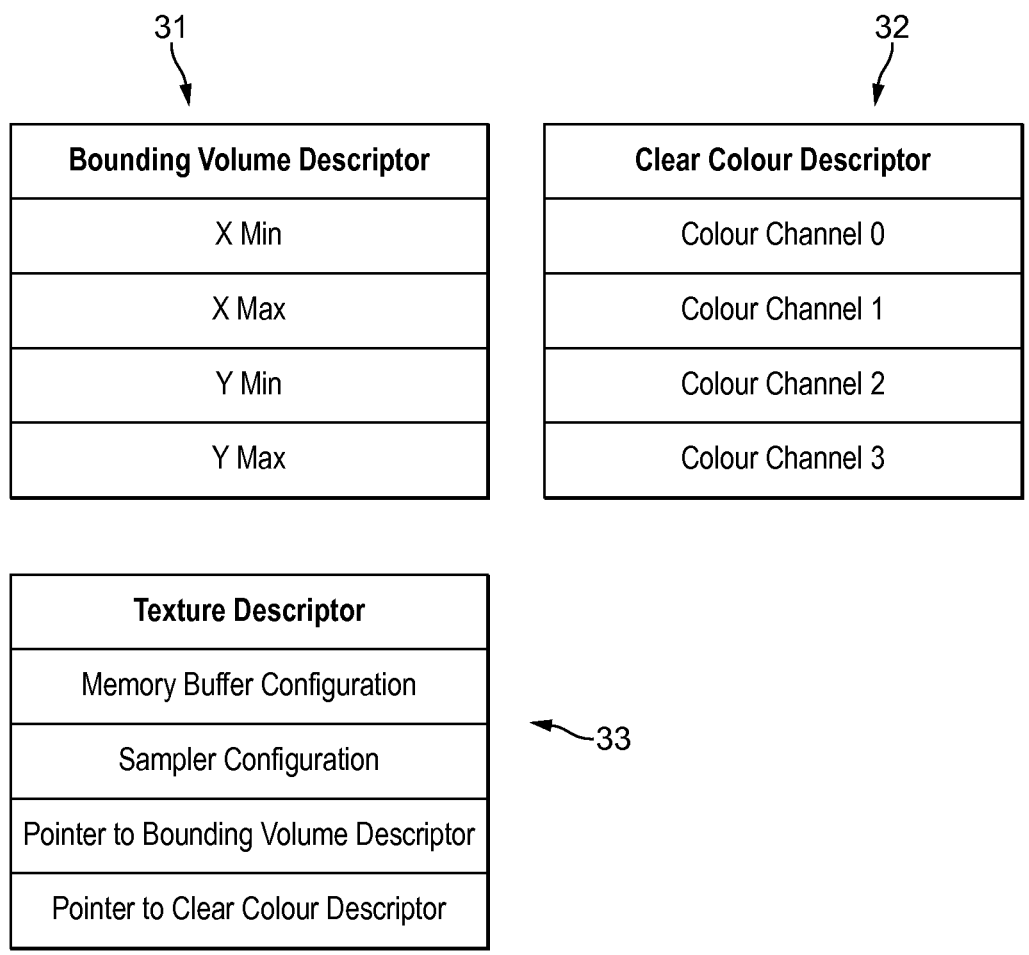
FIG. 7 shows schematically information provided in accordance with embodiments of the technology described herein.

FIG. 7 shows exemplary data structures for use in embodiments of the technology described herein. Bounding box information 31 may comprise minimum and maximum values in first (x) and second (y) directions (xMin, xMax, yMin and yMax). The default ("clear") colour definition 32 may comprise a data value for each of the four colour channels, as is known in the art. The texture descriptor 33 may comprise memory buffer configuration information, and sampler configuration information, along with a pointer to the bounding box information 31, and a pointer to the default (clear) colour information 32.

It can be seen from the above that the technology described herein, in its embodiments at least, provides a low power and bandwidth method and system in which an array of graphics data is generated in a first rendering pass and used as a texture in a subsequent rendering pass. This is achieved in embodiments of the technology described herein at least by determining one or more regions of the array of graphics data that have a particular characteristic, and using the determination in the first rendering pass to control the generation of the array of graphic data and/or using the determination in the second rendering pass to control the reading of the array of graphics data.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of operating a graphics processing system including processing circuitry processing graphics data for output, the method comprising: the processing circuitry generating in a first rendering pass an array of graphics data to be used in a subsequent rendering pass;

in the first rendering pass, determining by the processing circuitry one or more regions of the array of graphics data that have a particular characteristic, generating information indicative of the one or more regions of the array of graphics data that have the particular characteristic, wherein a region of the array of graphics data is determined to have the particular characteristic when it is determined that the region comprises or could comprise data positions having differing data values, and determining and storing in association with the array of graphics data a defined data value to be used for data positions of the array of graphics data that are determined to fall outside a region of the array of graphics data that is indicated to have the particular characteristic;

wherein the information indicative of the one or more regions of the array of graphics data that have the particular characteristic comprises one or more bounding boxes, or one or more bitmaps, indicative of the one or more regions;

using by the processing circuitry the array of graphics data generated in the first rendering pass in a subsequent rendering pass; and in the subsequent rendering pass, using by the processing circuitry the information indicative of the one or more regions of the array of graphics data to control reading of the array of graphics data when it is to be used in the subsequent rendering pass by:

for a data position within the array of graphics data whose data value is required when the array of graphics data that was generated in the first rendering pass is being used in the subsequent rendering pass:

using by the processing circuitry in the subsequent rendering pass the information indicative of the one or more regions of the array of graphics data that was generated in the first rendering pass to determine whether the data position within the array of graphics data falls within a region of the array of graphics data that has the particular characteristic, and:

when the data position is determined to fall within a region of the array of graphics data that k indicated by the information to have the particular characteristic, reading by the processing circuitry the data value that was generated in the first rendering pass for that position of the array of graphics data to use in the subsequent rendering pass for the data position; and when the data position is determined to fall outside a region of the array of graphics data that is indicated by the information to have the particular characteristic, using by the processing circuitry the defined data value stored in association with the array of graphics data in the first rendering pass for the data value for the data position in the subsequent rendering pass.

2. The method of claim 1, further comprising:

determining the one or more regions of the array of graphics data that have the particular characteristic before generating the array of graphics data in the first rendering pass; and using the determination of the one or more regions of the array of graphics data that have the particular characteristic to control the generation of the array of graphics data in the first rendering pass, by:

when a region of the array of graphics data is determined to have the particular characteristic, generating that region of the array of graphics data in the first rendering pass; and for parts of the array of graphics data other than determined to have the particular characteristic, other than generating those parts of the array of graphics data in the first rendering pass.

3. The method of claim 1, wherein determining one or more regions of the array of graphics data that have a particular characteristic comprises:

identifying one or more regions of the array of graphics data in which each data position within the region of the array of graphics data has or can be assumed to have a same data value as each other data position within that region; or identifying one or more regions of the array of graphics data in which each data position within the region of the array of graphics data other than has or cannot be assumed to have a same data value as each other data position within that region.

4. The method of claim 1, wherein determining one or more regions of the array of graphics data that have a particular characteristic comprises:

evaluating the generated array of graphics data to identify one or more regions of the array of graphics data in which each data position within the region of the array of graphics data has or other than has a same data value as each other data position within that region.

5. The method of claim 1, wherein determining one or more regions of the array of graphics data that have a particular characteristic comprises:

before generating the array of graphics data in the first rendering pass, determining one or more regions of the array of graphics data that contain geometry to be processed when generating the array of graphics data in the first rendering pass;

wherein the one or more regions of the array of graphics that are determined to contain geometry to be processed are determined to have the particular characteristic before the array of graphics data is generated in the first rendering pass.

6. A method of operating a graphics processing system including processing circuitry processing graphics data for output, the method comprising:

when an array of graphics data to be used in a subsequent rendering pass is to be generated in a first rendering pass:

in the first rendering pass, determining by the processing circuitry one or more regions of the array of graphics data that have a particular characteristic, generating information indicative of the one or more regions of the array of graphics data that have the particular characteristic, wherein a region of the array of graphics data is determined to have the particular characteristic when it is determined that the region comprises or could comprise data positions having differing data values;

wherein the information indicative of the one or more regions of the array of graphics data that have the particular characteristic comprises one or more bounding boxes, or one or more bit maps, indicative of the one or more regions;

controlling, by the processing circuitry, the generation of the array of graphics data in the first rendering pass based on the determination;

determining in the first rendering pass, by the processing circuitry, and storing in association with the array of graphics data, a defined data value to be used for data positions of the array of graphics data that are determined to fall outside a region of the array of graphics data that is indicated to have the particular characteristic; and the processing circuitry using the array of graphics data generated in the first rendering pass in the subsequent rendering pass;

wherein controlling the generation of the array of graphics in the first rendering pass data comprises:

when a region of the array of graphics data is determined to have the particular characteristic, generating that region of the array of graphics data in the first rendering pass; and for parts of the array of graphics data determined to other than have the particular characteristic, other than generating those parts of the array of graphics data in the first rendering pass;

the method further comprising in the subsequent rendering pass:

for a data position within the array of graphics data that was generated in the first rendering pass whose data value is required when the array of graphics data is being used in the subsequent rendering pass:

using the information indicative of the one or more regions of the array of graphics data that have the particular characteristic that was generated in the first rendering pass to determine whether the data position within the array of graphics data falls within a generated region of the array of graphics data that has the particular characteristic, and:

when the data position is determined to fall within a generated region of the array of graphics data, reading the data value that was generated in the first rendering pass for that position of the generated array of graphics data to use in the subsequent rendering pass for the data position; and when the data position is determined to fall outside a generated region of the array of graphics data, using the defined data value stored in association with the array of graphics data in the first rendering pass for the data value for the data position in the subsequent rendering pass.

7. A graphics processing system, the graphics processing system comprising:

a graphics processor; and a memory for storing data to be used by and generated by the graphics processor; and wherein: the graphics processor is configured to:

generate in a first rendering pass an array of graphics data to be used in a subsequent rendering pass and to store the generated array of graphics data in the memory;

in the first rendering pass, determine one or more regions of the array of graphics data that have a particular characteristic, generate information indicative of the one or more regions of the array of graphics data that have the particular characteristic, wherein a region of the array of graphics data k determined to have the particular characteristic when it k determined that the region comprises or could comprise data positions having differing data values, and determine and store in association with the array of graphics data a defined data value to be used for data positions of the array of graphics data that are determined to fall outside a region of the array of graphics data that is indicated to have the particular characteristic;

wherein the information indicative of the one or more regions of the array of graphics data that have the particular characteristic comprises one or more bounding boxes, or one or more bitmaps, indicative of the one or more regions;

use the array of graphics data generated in the first rendering pass in a subsequent rendering pass; and in the subsequent rendering pass, use the information indicative of the one or more regions of the array of graphics data to control reading of the array of graphics data when it is to be used in the subsequent rendering pass;

wherein the graphics processor is configured to:

for a data position within the array of graphics data whose data value is required when the array of graphics data that was generated in the first rendering pass is being used in the subsequent rendering pass:

use in the subsequent rendering pass the information indicative of the one or more regions of the array of graphics data that was generated in the first rendering pass to determine whether the data position within the array of graphics data falls within a region of the array of graphics data that has the particular characteristic, and:

when the data position is determined to fall within a region of the array of graphics data that is indicated by the information to have the particular characteristic, read the data value that was generated in the first rendering pass for that position of the array of graphics data to use in the subsequent rendering pass for the data position; and when the data position is determined to fall outside a region of the array of graphics data that is indicated by the information to have the particular characteristic, use the defined data value stored in association with the array of graphics data in the first rendering pass for the data value for the data position in the subsequent rendering pass.

8. The system of claim 7, wherein the graphics processor is configured to determine the one or more regions of the array of graphics data that have the particular characteristic before generating the array of graphics data in the first rendering pass and to use the determination of the one or more regions of the array of graphics data that have the particular characteristic to control the generation of the array of graphics data in the first rendering pass, by:

when generating the array of graphics data in the first rendering pass:

when a region of the array of graphics data is determined to have the particular characteristic, generating that region of the array of graphics data in the first rendering pass; and for parts of the array of graphics data other than determined to have the particular characteristic, other than generating those parts of the array of graphics data in the first rendering pass.

9. A graphics processing system, the graphics processing system comprising:

a graphics processor; and a memory for storing data to be used by and generated by the graphics processor; and wherein:

the graphics processor is configured to:

generate in a first rendering pass an array of graphics data to be used in a subsequent rendering pass and to store the generated array of graphics data in the memory; and to:

in the first rendering pass, determine one or more regions of the array of graphics data that have a particular characteristic, generate information indicative of the one or more regions of the array of graphics data that have the particular characteristic, wherein a region of the array of graphics data is determined to have the particular characteristic when it is determined that the region comprises or could comprise data positions having differing data values;

wherein the information indicative of the one or more regions of the array of graphics data that have the particular characteristic comprises one or more bounding boxes, or one or more bit maps, indicative of the one or more regions;

control the generation of the array of graphics data in the first rendering pass based on the determination;

determine in the first rendering pass and store in association with the array of graphics data a defined data value to be used for data positions of the array of graphics data that are determined to fall outside a region of the array of graphics data that is indicated to have the particular characteristic; and to use the array of graphics data generated in the first rendering pass in the subsequent rendering pass;

wherein the graphics processor is configured to control the generation of the array of graphics data in the first rendering pass by:

when a region of the array of graphics data is determined to have the particular characteristic, generating that region of the array of graphics data in the first rendering pass; and for parts of the array of graphics data determined to other than have the particular characteristic, other than generating those parts of the array of graphics data in the first rendering pass;

wherein the graphics processor is configured to, in the subsequent rendering pass:

for a data position within the array of graphics data that was generated in the first rendering pass whose data value is required when the array of graphics data is being used in the subsequent rendering pass:

using the information indicative of the one or more regions of the array of graphics data that have the particular characteristic that was generated in the first rendering pass to determine whether the data position within the array of graphics data falls within a generated region of the array of graphics data that has the particular characteristic, and:

when the data position is determined to fall within a generated region of the array of graphics data, read the data value that was generated in the first rendering pass for that position of the generated array of graphics data to use in the subsequent rendering pass for the data position; and when the data position is determined to fall outside a generated region of the array of graphics data, use the defined data value stored in association with the array of graphics data in the first rendering pass for the data value for the data position in the subsequent rendering pass.

10. The system of claim 7, wherein the graphics processor is configured to determine one or more regions of the array of graphics data that have a particular characteristic by:

identifying in the first rendering pass one or more regions of the array of graphics data in which each data position within the region of the array of graphics data has or can be assumed to have a same data value as each other data position within that region; or identifying in the first rendering pass one or more regions of the array of graphics data in which each data position within the region of the array of graphics data other than has or cannot be assumed to have a same data value as each other data position within that region.

11. The system of claim 7, wherein the graphics processor is configured to determine one or more regions of the array of graphics data that have a particular characteristic by:

evaluating the generated array of graphics data to identify one or more regions of the array of graphics data in which each data position within the region of the array of graphics data has or other than has a same data value as each other data position within that region.

12. The system of claim 7, wherein the graphics processor is configured to determine one or more regions of the array of graphics data that have a particular characteristic by:

before generating the array of graphics data in the first rendering pass, determining one or more regions of the array of graphics data that contain geometry to be processed when generating the array of graphics data in the first rendering pass;

wherein the one or more regions of the array of graphics data that are determined to contain geometry to be processed are determined to have the particular characteristic before the array of graphics data is generated in the first rendering pass.

13. A non-transitory computer readable storage medium storing computer software code which when executing on a processor performs a method of operating a graphics processing system when processing graphics data for output, the method comprising:

generating in a first rendering pass an array of graphics data to be used in a subsequent rendering pass;

in the first rendering pass, determining one or more regions of the array of graphics data that have a particular characteristic, generating information indicative of the one or more regions of the array of graphics data that have the particular characteristic, wherein a region of the array of graphics data is determined to have the particular characteristic when it is determined that the region comprises or could comprise data positions having differing data values, and determining and storing in association with the array of graphics data a defined data value to be used for data positions of the array of graphics data that are determined to fall outside a region of the array of graphics data that is indicated to have the particular characteristic;

wherein the information indicative of the one or more regions of the array of graphics data that have the particular characteristic comprises one or more bounding boxes, or one or more bitmaps, indicative of the one or more regions;

using the array of graphics data generated in the first rendering pass in a subsequent rendering pass; and in the subsequent rendering pass, using the information indicative of the one or more regions of the array of graphics data to control reading of the array of graphics data when it is to be used in the subsequent rendering pass by:

for a data position within the array of graphics data whose data value is required when the array of graphics data that was generated in the first rendering pass is being used in the subsequent rendering pass:

using in the subsequent rendering pass the information indicative of the one or more regions of the array of graphics data that was generated in the first rendering pass to determine whether the data position within the array of graphics data falls within a region of the array of graphics data that has the particular characteristic, and:

when the data position is determined to fall within a region of the array of graphics data that is indicated by the information to have the particular characteristic, reading the data value that was generated in the first rendering pass for that position of the array of graphics data to use in the subsequent rendering pass for the data position; and when the data position is determined to fall outside a region of the array of graphics data that is indicated by the information to have the particular characteristic, using the defined data value stored in association with the array of graphics data in the first rendering pass for the data value for the data position in the subsequent rendering pass.

14. A non-transitory computer readable storage medium storing computer software code which when executing on a processor performs a method of operating a graphics processing system when processing graphics data for output, the method comprising, when an array of graphics data to be used in a subsequent rendering pass is to be generated in a first rendering pass:

in the first rendering pass, determining one or more regions of the array of graphics data that have a particular characteristic, generating information indicative of the one or more regions of the array of graphics data that have the particular characteristic, wherein a region of the array of graphics data is determined to have the particular characteristic when it is determined that the region comprises or could comprise data positions having differing data values;

wherein the information indicative of the one or more regions of the array of graphics data that have the particular characteristic comprises one or more bounding boxes, or one or more bit maps, indicative of the one or more regions;

controlling the generation of the array of graphics data in the first rendering pass based on the determination;

determining in the first rendering pass and storing in association with the array of graphics data a defined data value to be used for data positions of the array of graphics data that are determined to fall outside a region of the array of graphics data that is indicated to have the particular characteristic; and using the array of graphics data generated in the first rendering pass in the subsequent rendering pass;

wherein controlling the generation of the array of graphics data in the first rendering pass comprises:

when a region of the array of graphics data is determined to have the particular characteristic, generating that region of the array of graphics data in the first rendering pass; and for parts of the array of graphics data determined to other than have the particular characteristic, other than generating those parts of the array of graphics data in the first rendering pass;

the method further comprising in the subsequent rendering pass:

for a data position within the array of graphics data that was generated in the first rendering pass whose data value is required when the array of graphics data is being used in the subsequent rendering pass:

using the information indicative of the one or more regions of the array of graphics data that have the particular characteristic that was generated in the first rendering pass to determine whether the data position within the array of graphics data falls within a generated region of the array of graphics data that has the particular characteristic, and:

when the data position is determined to fall within a generated region of the array of graphics data, reading the data value that was generated in the first rendering pass for that position of the generated array of graphics data to use in the subsequent rendering pass for the data position; and when the data position is determined to fall outside a generated region of the array of graphics data, using the defined data value stored in association with the array of graphics data in the first rendering pass for the data value for the data position in the subsequent rendering pass.

* * * * *

UNITED STATES PATENT AND TRADEMARK OFFICE
CERTIFICATE OF CORRECTION

| | |
|---|---|
| PATENT NO. | : 10,559,054 B2 |
| APPLICATION NO. | : 14/681479 |
| DATED | : February 11, 2020 |
| INVENTOR(S) | : Harris et al. |

It is certified that error appears in the above-identified patent and that said Letters Patent is hereby corrected as shown below:

In the Claims

Column 21, Line 15 (Claim 1, Line 46) please change "k" to --is--

Column 23, Line 30 (Claim 7, Line 15) please change "k" to --is--

Column 23, Line 31 (Claim 7, Line 16) please change "k" to --is--

Signed and Sealed this
Fifth Day of October, 2021

Drew Hirshfeld
*Performing the Functions and Duties of the
Under Secretary of Commerce for Intellectual Property and
Director of the United States Patent and Trademark Office*